United States Patent
Bjontegaard

(10) Patent No.: US 7,295,613 B2
(45) Date of Patent: Nov. 13, 2007

(54) EARLY DETECTION OF ZEROS IN THE TRANSFORM DOMAIN

(75) Inventor: Gisle Bjontegaard, Oppegard (NO)

(73) Assignee: Tandberg Telecom AS, Lysaker (NO)

( * ) Notice: Subject to any disclaimer, the term of this patent is extended or adjusted under 35 U.S.C. 154(b) by 287 days.

(21) Appl. No.: 10/831,158

(22) Filed: Apr. 26, 2004

(65) Prior Publication Data

US 2004/0264575 A1 Dec. 30, 2004

(30) Foreign Application Priority Data

Jun. 27, 2003 (NO) ................................. 20032980

(51) Int. Cl.
*H04N 7/18* (2006.01)
(52) U.S. Cl. .............................. 375/240.18; 375/240.24
(58) Field of Classification Search ..............................
375/240.12–240.16, 240.03, 240.18, 240.24, 375/240.2; 345/611; *H04N 7/12*
See application file for complete search history.

(56) References Cited

U.S. PATENT DOCUMENTS

| | | | | |
|---|---|---|---|---|
| 5,815,602 | A * | 9/1998 | Ueda et al. | 375/240.16 |
| 5,872,866 | A * | 2/1999 | Strongin et al. | 375/240.2 |
| 6,351,567 | B1 | 2/2002 | McVeigh et al. | |
| 6,763,070 | B1 * | 7/2004 | Lee | 375/240.2 |
| 6,927,780 | B2 * | 8/2005 | Guleryuz et al. | 345/611 |
| 2003/0113026 | A1 | 6/2003 | Srinivasan et al. | |
| 2003/0202594 | A1 * | 10/2003 | Lainema | 375/240.16 |
| 2004/0086047 | A1 * | 5/2004 | Kondo et al. | 375/240.16 |

OTHER PUBLICATIONS

E. G. Richardson, http://www.vcodex.fsnet.co.uk/h264_transform.pdf, pp. 1-9, "H.264/MPEG-4 Part 10 White Paper: Transform & Quantization", Mar. 19, 2003.
J.-F. Yang, et al., IEEE Transactions on Circuits and Systems for Video Technology, vol. 12, No. 10, pp. 948-951, "Computation Reduction for Motion Search in Low Rate Video Coders", Oct. 2002.
Z. Xuan, et al., Electronics Letters, vol. 34, No. 19, pp. 1839-1840, "Method for Detecting All-Zero DCT Coefficients Ahead of Discrete Cosine Transformation and Quantisation", Sep. 17, 1998.
S. Jun, et al., Electronics Letters, vol. 37, No. 3, pp. 160-161, "Efficient Method for Early Detection of All Zero DCT Coefficients", Feb. 1, 2001.
C. Du, et al., WCCC-ICSP 2000, 5th International Conference on Signal Processing, vol. 2, pp. 1110-1114, "Early Detection of all Zero Chroma Blocks in H.263", Aug. 21-25, 2000.

* cited by examiner

*Primary Examiner*—Anand Rao
(74) *Attorney, Agent, or Firm*—Oblon, Spivak, McClelland, Maier & Neustadt, P.C.

(57) ABSTRACT

A method detects blocks that are to be indicated as skipped at an earlier stage of the encoding process, than would be the case with other implementations of the ITU H.263 and H.264 standards. The method includes transforming 4×4 blocks in the macro blocks having a skip vector of zero with a binary-transform function. The blocks having values of the four uppermost left binary-transform coefficients less than a predefined threshold, are defined as skipped, thus, minimizing the need for computationally demanding block transformation or quantization.

24 Claims, 2 Drawing Sheets

EARLY DETECTION OF ZEROS IN THE TRANSFORM DOMAIN

BACKGROUND OF THE INVENTION

1. Field of the Invention

The invention is related to video compression systems.

2. Discussion of the Background

Transmission of moving pictures in real-time is employed in several applications like video conferencing, net meetings, TV broadcasting and video telephony.

However, representing moving pictures requires bulk information as digital video typically is described by representing each pixel in a picture with 8 bits (1 Byte). Such uncompressed video data results in large bit volumes, and can not be transferred over conventional communication networks and transmission lines in real time due to limited bandwidth.

Thus, enabling real time video transmission requires a large extent of data compression. Data compression may, however, compromise picture quality. Therefore, great efforts have been made to develop compression techniques allowing real time transmission of high quality video over bandwidth limited data connections.

In video compression systems, one goal is to represent the video information with as little capacity as possible. Capacity is defined with bits, either as a constant value or as bits/time unit. In both cases, it is preferable to reduce the number of bits.

The most common video coding method is described in the MPEG* and H.26* standards. The video data undergoes four main processes before transmission, namely prediction, transformation, quantization and entropy coding.

The prediction process significantly reduces the amount of bits required for each picture in a video sequence to be transferred. It takes advantage of the similarity of parts of the sequence with other parts of the sequence. Since the predictor part is known to both encoder and decoder, only the difference has to be transferred. This difference typically requires much less capacity for its representation. The prediction is mainly based on picture content from previously reconstructed pictures where the location of the content is defined by motion vectors. The prediction process is typically performed on square block sizes (e.g., 16×16 pixels). Note that in some cases, predictions of pixels based on adjacent pixels in the same picture rather than pixels of preceding pictures are used. This is referred to as intra prediction, as opposed to inter prediction.

The residual, represented as a block of data (e.g., 4×4 pixels), still contains internal correlation. A well-known method of taking advantage of this is to perform a two dimensional block transform. The ITU recommendation H.264 uses a 4×4 integer type transform. This transforms 4×4 pixels into 4×4 transform coefficients and they can usually be represented by fewer bits than the pixel representation. Transformation of a 4×4 array of pixels with internal correlation will probably result in a 4×4 block of transform coefficients with much fewer non-zero values than the original 4×4 pixel block.

Direct representation of the transform coefficients is still too costly for many applications. A quantization process is carried out for further reduction of the data representation. Hence the transform coefficients undergo quantization. The possible value range of the transform coefficients is divided into value intervals each limited by an uppermost and lowermost decision value and assigned a fixed quantization value. The transform coefficients are then quantified to the quantization value associated with the intervals within which the respective coefficients reside. Coefficients being lower than the lowest decision value are quantified to zero. It should be mentioned that this quantization process results in a reconstructed video sequence that is somewhat different than the uncompressed sequence.

As already indicated, one characteristic of video content to be coded is the requirement that bits to describe the sequence are strongly varying. For several applications it is well known for a person skilled in the art that the content in a considerable part of the picture is unchanged from frame to frame. H.264 widens this definition so that parts of the picture with constant motion can also be coded without use of additional information. Regions with little or no change from frame to frame require a minimum number of bits to be represented. The blocks included in such regions are defined as "skipped", reflecting that no changes or only predictable motion relative to the corresponding previous blocks occur, hence no data is required for representing these blocks other than an indication that the blocks are to be decoded as "skipped". This indication may be common to several macro blocks.

As H.264 is a decoding specification it does not describe any methods for detecting regions of marginal or no changes prior to the transformation and quantization process. As a result, these regions could undergo motion search, transformation and quantization, even if they finally would be defined as skipped and not represented with any data. As these operations require processing capacity, this is unnecessary consumption of resources in the encoder. Effective utilization of processing resourses is particularly crucial in connection with H.264 as it requires large processing resources. At least for some applications it is therefore very desirable to reduce encoder complexity.

Another problem associated with H.264 is that the coding usually is "lossy" in the sense that each picture is reconstructed with some error. This fact together with noise on the source signal means that there will always be a difference between an uncoded block and the collocated block in the previous picture even if there is no real change in the picture content. A typical encoding procedure may therefore often lead to coding of this as a residual signal. This will typically lead to a slight improvement of the objective reconstruction of the block, but will result in an annoying flickering effect in still regions of the picture.

SUMMARY OF THE INVENTION

Accordingly, one object of the present invention is to provide a novel method avoiding the above described problems.

The features defined in the independent claims enclosed characterize this method.

In particular, the present invention provides a method of video coding for transforming a first block of residual pixel values of moving pictures by an integer-transform function generating a corresponding second block of integer-transform coefficients followed by quantifying the integer-transform coefficients using quantization intervals defined by a number of decision values, wherein the method includes the steps of transforming the first block by a binary-transform function generating a corresponding third block of binary-transform coefficients, and defining the second block to solely include zeros if one or more binary-transform coefficients in the uppermost left corner of the third block are less than a predefined threshold.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
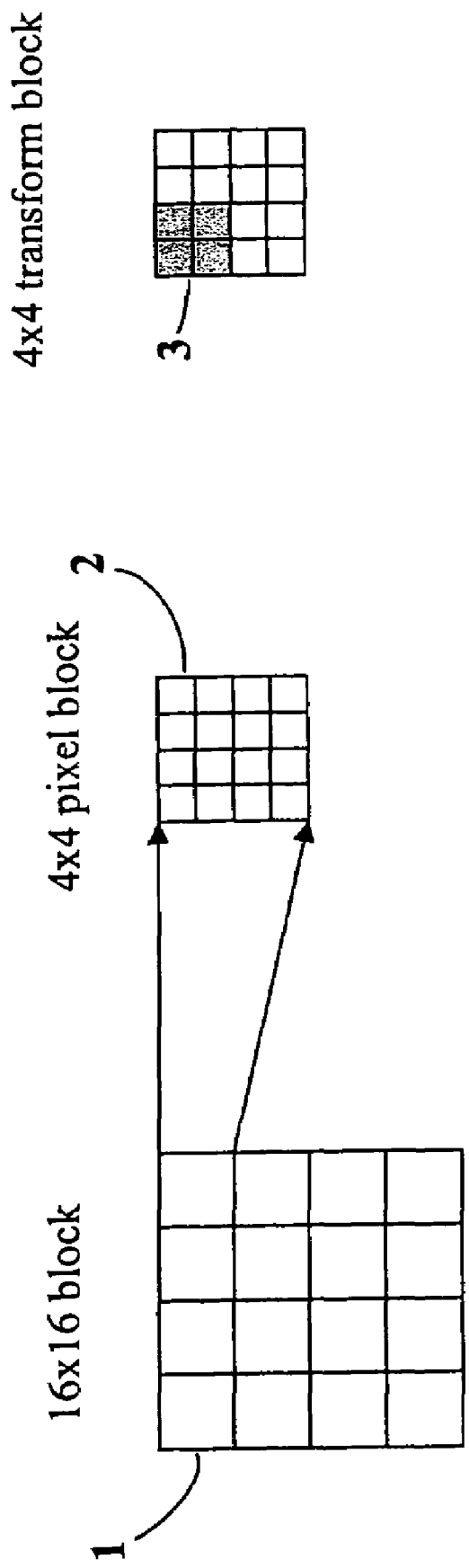
FIG. 1 shows a single 16×16 macro block divided into a 4×4 pixel block, which block is further divided into a 4×4 transform block.

In the following, the present invention will be discussed by describing preferred embodiments, and by referring to the accompanying drawings. However, a person skilled in the art will realize other applications and modifications within the scope of the invention as defined in the enclosed independent claim.

The present invention provides a method for detecting blocks that are to be indicated as skipped at an earlier stage of the encoding process than in other implementations of the ITU H.263 and H.264 standards.

According to a preferred embodiment of the invention, each single 16×16 macro block is taken into consideration when detecting blocks labeled as "skipped". Some preliminary steps are required on the respective macro blocks before executing the main decision-making process.

The first of the preliminary steps aims at finding a so-called skip vector. The deriving of a skip vector follows the prediction of the corresponding motion vector for a 16×16 block, as defined in H.264. One difference is that the skip vector is set to zero at certain conditions when the 16×16 prediction vector is not. These conditions are also defined in the H.264 standard. The skip vector of a 16×16 macro block is defined by the vectors of nearby and already coded macro blocks. The procedure is well defined in H.264. Then, based on the derived skip vector, a decision is made whether or not to proceed to the next step for the macro block in question. The criterion for proceeding, i.e. for assuming that the macro block is a candidate for being defined as skipped at an early stage, may be that the skip vector is equal to zero, as according to H.263. This means that the situation is only further checked with no motion at all, whereas H.264 also leaves room to define a macro block as skipped with a skip vector prediction different from zero. In the following, however, it is assumed that the skip vector is determined as being equal to zero.

The next preliminary step is to find the residual, defined as the pixel by pixel difference between the macro block to be coded and the collocated block in a previously decoded frame. This process does not require much of the processing capacity. The above mentioned assumption of the skip vector being equal to zero implies that the residual is always found by subtracting the pixels of the present macro block from the previous collocated block, and not a block with a relative spatial offset.

After being through the preliminary steps of the skip detection process, the macro block is investigated to see if at least parts of it meet the predefined criterions for being classified as skipped.

One skip detection approach is based solely on the pixel based residual. A threshold is defined with a criterion based on the maximum, average or some other combination of pixels exceeding this threshold, for example.

On the other hand, it is known that when coding the macro block, a transform is performed on the residual pixel values. The subsequent quantization process would likely introduce many zero values, as all transform values below the lowest decision value are set to zero. If all the transform coefficients are zero after quantization, the macro block is defined as skipped. Because the lowest decision value of the transform values is not directly derivable to a threshold in the pixel domain, comparisons with a threshold in the pixel domain will often give a different result than doing the same comparison in the transform domain. On the other hand, performing the transform and subsequently checking all coefficients to find the blocks filled with zeros is capacity consuming.

According to the present invention, a full transform of the skipped blocks is avoided by instead introducing a simplified and less demanding transform for the purpose of detecting skipped blocks prior to the ordinary transform.

To illustrate the simplified transform, FIG. 1 shows a part of the partitioning of the picture pixels according to H.264. A 16×16 macro block (1) is divided into 16 4×4 blocks (2), preparing for a transformation on each 4×4 block by means of a two-dimensional integer transform resulting in 4×4 transform coefficients. The transform to be used in the real transform according to H.264 is a 4×4 integer type transform, and the coefficients of which are organized so that the upper left value of the transformed block represents the sum or average of all pixels. As we move to the right and downwards, the transform coefficients represent the contribution from higher frequencies horizontally and vertically. Most of the "energy" of the signal is therefore statistically concentrated towards low frequency (upper left) contribution of the transform. The upper left coefficient is often referred to as the DC coefficient. Thus, it would be reasonable to assume that it is sufficient to concentrate on the 4 coefficients towards upper left in a 4×4 block (3). These 4 coefficients are shaded in FIG. 1. Note that depending on the transform being used, the DC coefficient and the other "low frequency" coefficients representing most of the "energy" of the values to be transformed are not restricted to be located in the uppermost, left corner. Generally speaking, the "low frequency" coefficients of a block are located on the low coordinate positions of the block.

However, as earlier indicated, a simplified transform is used in detecting skipped blocks according to the present invention. The transform according to a preferred embodiment of the present invention is deduced from the Hadamard transform. Unlike the 4×4 integer type transform, the elements of the basis vectors of the Hadamard transform take only the binary values +1 and −1. They are, therefore, well suited for digital signal processing applications where computational simplicity is required. The basis vectors of the simplified transform are shown below.

$$
\begin{array}{cc}
\begin{array}{rrrr}
1 & 1 & 1 & 1 \\
1 & 1 & 1 & 1 \\
1 & 1 & 1 & 1 \\
1 & 1 & 1 & 1 \\
1 & 1 & 1 & 1 \\
1 & 1 & 1 & 1 \\
-1 & -1 & -1 & -1 \\
-1 & -1 & -1 & -1
\end{array}
&
\begin{array}{rrrr}
1 & 1 & -1 & -1 \\
1 & 1 & -1 & -1 \\
1 & 1 & -1 & -1 \\
1 & 1 & -1 & -1 \\
1 & 1 & -1 & -1 \\
1 & 1 & -1 & -1 \\
-1 & -1 & 1 & 1 \\
-1 & -1 & 1 & 1
\end{array}
\end{array}
$$

The coefficients for a block are derived by multiplying the block with the basis vectors associated with the respective coefficient positions. With the above basis vectors the calculations reduce to additions and subtractions. Such a transform will be referred to as a binary transform.

Using the above basis vectors for deriving the four upper left coefficients provides a result that is reasonably close to the corresponding coefficients of the 4×4 integer type transform specified in H.264. In fact, the uppermost left coefficient would be identical to the real transform. Consequently, the lowermost decision level for the DC coefficient of the 4×4 integer type transform could be used directly as thresholds for the respective four coefficients of the simplified transform.

In this way, a very good test for detecting zero coefficients is achieved, as it is known that these four coefficients are statistically the biggest, and assuming that the remaining coefficients are zero if the four coefficients are below the threshold.

The present invention provides a simple method of detecting coefficient zeros prior to transformation and quantization, resulting in considerable computational savings due to avoidance of motion vector search and less transformation and quantization.

Further, the present invention represents a good balance between the two requirements of detecting as many macro blocks as possible with no change and as few macro blocks as possible being defined as skipped when it should have been coded.

The present invention also limits transform-introduced noise due to a reduction of the number of transformations of value close to zero.

Figure 2:
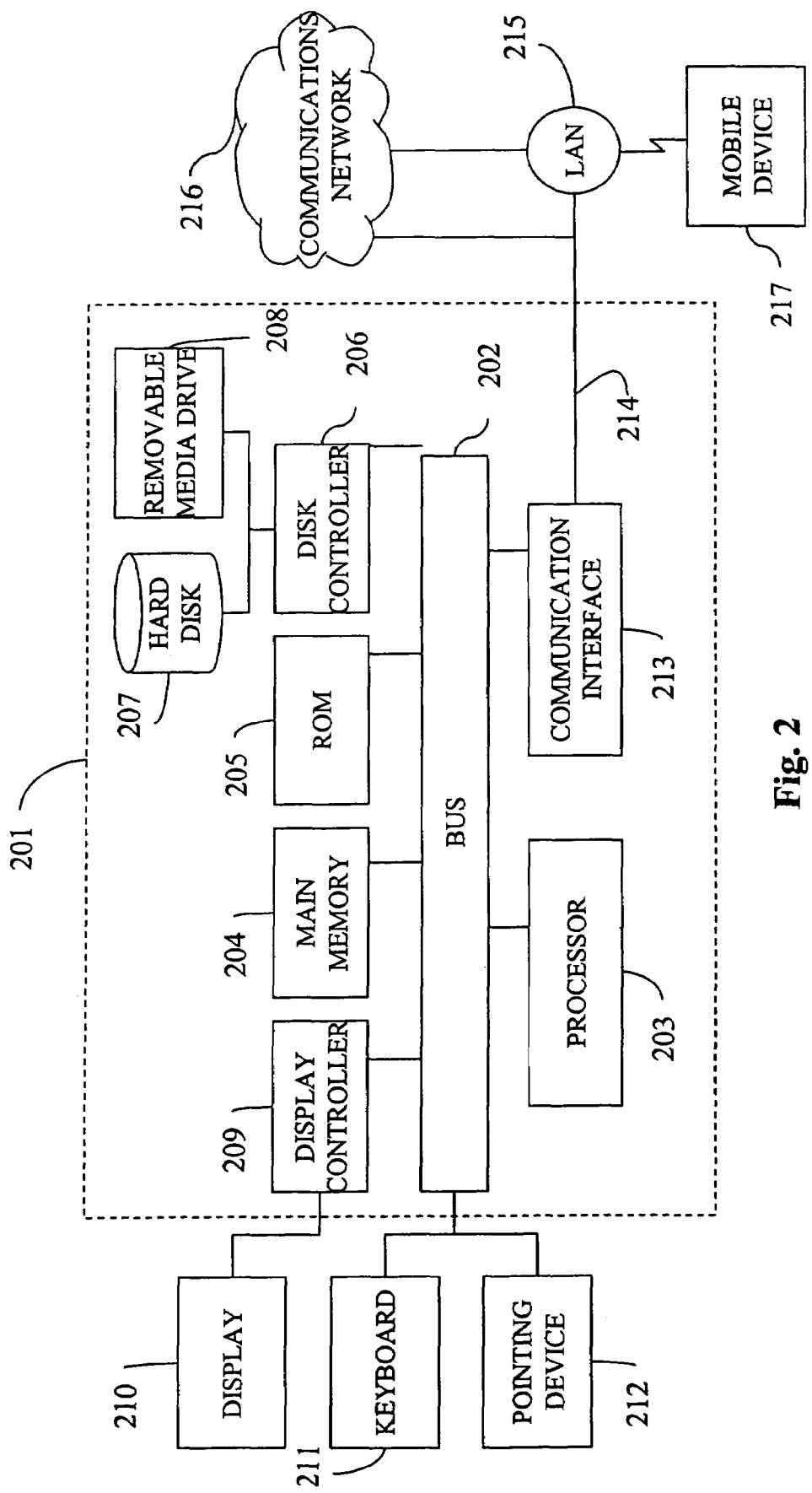
FIG. 2 shows an example of a computer configured to implement an embodiment of the present invention.

FIG. 2 illustrates a computer system 201 upon which an embodiment of the present invention may be implemented. The computer system 201 includes a bus 202 or other communication mechanism for communicating information, and a processor 203 coupled with the bus 202 for processing the information. The computer system 201 also includes a main memory 204, such as a random access memory (RAM) or other dynamic storage device (e.g., dynamic RAM (DRAM), static RAM (SRAM), and synchronous DRAM (SDRAM)), coupled to the bus 202 for storing information and instructions to be executed by processor 203. In addition, the main memory 204 may be used for storing temporary variables or other intermediate information during the execution of instructions by the processor 203. The computer system 201 further includes a read only memory (ROM) 205 or other static storage device (e.g., programmable ROM (PROM), erasable PROM (EPROM), and electrically erasable PROM (EEPROM)) coupled to the bus 202 for storing static information and instructions for the processor 203.

The computer system 201 also includes a disk controller 206 coupled to the bus 202 to control one or more storage devices for storing information and instructions, such as a magnetic hard disk 207, and a removable media drive 208 (e.g., floppy disk drive, read-only compact disc drive, read/write compact disc drive, compact disc jukebox, tape drive, and removable magneto-optical drive). The storage devices may be added to the computer system 201 using an appropriate device interface (e.g., small computer system interface (SCSI), integrated device electronics (IDE), enhanced-IDE (E-IDE), direct memory access (DMA), or ultra-DMA).

The computer system 201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 201 may also include a display controller 209 coupled to the bus 202 to control a display 210, such as a cathode ray tube (CRT), plasma display or liquid crystal display, for displaying information to a computer user. The computer system includes input devices, such as a keyboard 211 and a pointing device 212, for interacting with a computer user and providing information to the processor 203. The pointing device 212, for example, may be a mouse, a trackball, or a pointing stick for communicating direction information and command selections to the processor 203 and for controlling cursor movement on the display 210. In addition, a printer may provide printed listings of data stored and/or generated by the computer system 201.

The computer system 201 performs a portion or all of the processing steps of the video coding in response to the processor 203 executing one or more sequences of one or more instructions contained in a memory, such as the main memory 204. Such instructions may be read into the main memory 204 from another computer readable medium, such as a hard disk 207 or a removable media drive 208. One or more processors in a multi-processing arrangement may also be employed to execute the sequences of instructions contained in main memory 204. In alternative embodiments, hard-wired circuitry may be used in place of or in combination with software instructions. Thus, embodiments are not limited to any specific combination of hardware circuitry and software.

As stated above, the computer system 201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 201, for driving a device or devices for implementing the invention, and for enabling the computer system 201 to interact with a human user (e.g., video coding user). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 203 for execution. A computer readable medium may take many forms, including but not limited to, non-volatile media, volatile media, and transmission media. Non-volatile media includes, for example, optical, magnetic disks, and magneto-optical disks, such as the hard disk 207 or the removable movable media drive 208. Volatile media includes dynamic memory, such as the main memory 204. Transmission media includes coaxial cables, copper wire and fiber optics, including the wires that make up the bus 202. Transmission media also may also take the form of acoustic or light waves, such as those generated during radio wave and infrared data communications.

Various forms of computer readable media may be involved in carrying out one or more sequences of one or more instructions to processor 203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 201 may receive the data on the telephone line and use an infrared transmitter to convert the data to an infrared signal. An infrared detector coupled to the bus 202 can receive the data carried in the infrared signal and place the data on the bus 202. The bus 202 carries the data to the main memory 204, from which the processor 203 retrieves and executes the instructions. The instructions received by the main memory 204 may optionally be stored on storage device 207 or 208 either before or after execution by processor 203.

The computer system 201 also includes a communication interface 213 coupled to the bus 202. The communication interface 213 provides a two-way data communication coupling to a network link 214 that is connected to, for example, a local area network (LAN) 215, or to another communications network 216 such as the Internet. For example, the communication interface 213 may be a network interface card to attach to any packet switched LAN. As another example, the communication interface 213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 213 sends and receives electrical, electromagnetic or optical signals that carry digital data streams representing various types of information.

The network link 214 typically provides data communication through one or more networks to other data devices. For example, the network link 214 may provide a connection to another computer through a local network 215 (e.g., a LAN) or through equipment operated by a service provider, which provides communication services through a communications network 216. The local network 214 and the communications network 216 use, for example, electrical, electromagnetic, or optical signals that carry digital data streams, and the associated physical layer (e.g., CAT 5 cable, coaxial cable, optical fiber, etc). The signals through the various networks and the signals on the network link 214 and through the communication interface 213, which carry the digital data to and from the computer system 201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 201 can transmit and receive data, including program code, through the network(s) 215 and 216, the network link 214 and the communication interface 213. Moreover, the network link 214 may provide a connection through a LAN 215 to a mobile device 217 such as a personal digital assistant (PDA) laptop computer, or cellular telephone.

Numerous modifications and variations of the present invention are possible in light of the above teachings. It is therefore to be understood that within the scope of the appended claims, the invention may be practiced otherwise than as specifically described herein.

The invention claimed is:

1. A method of coding video, comprising:
identifying a first block of residual pixel values of moving pictures;
transforming the residual pixel values of the first block by a binary-transform function and generating a corresponding partial third block of binary-transform coefficients;
creating a second block of integer-transform coefficients based on the first block;
defining the second block to include only zeros when all of the binary-transform coefficients in the partial third block are less than a predefined threshold; and
skipping the second block when coding the video if including only zeros.

2. A method according to claim 1, wherein said predefined threshold is a smallest decision value of a number of decision values.

3. A method according to claim 1, wherein the first block and the second block each represent a same first squared area of 4×4 pixels in a moving picture.

4. A method according to claim 3, wherein said first squared area covers one sixteenth of a macro block representing a second squared area of 16×16 pixels in said moving picture.

5. A method according to claim 4, further comprising:
determining a skip vector for said macro block based on existing motion vectors of spatially adjacent blocks in said moving picture; and
executing said transforming the first block by a binary-transform function only if said skip vector is equal to zero.

6. A method according to claim 1, wherein said binary-transform function includes a Hadamard transform or a transform derived from said Hadamard transform.

7. A method according to claim 1, wherein
the binary-transform coefficients include four binary-transform coefficients in an uppermost left corner of the third block.

8. A method according to claim 1, further comprising:
executing said transforming the first block by a binary-transform function prior to said transforming the first block by an integer-transform function.

9. A computer readable medium encoded with instructions, which when executed by a computer implement a method of coding video, said method comprising:
identifying a first block of residual pixel values of moving pictures;

transforming the residual pixel values of the first block by a binary-transform function and generating a corresponding partial third block of binary-transform coefficients;

creating a second block of integer-transform coefficients based on the first block, defining the second block to include only zeros when all of the binary-transform coefficients in the partial third block are less than a predefined threshold; and skipping the second block when coding the video if including only zeros.

10. The computer readable storage medium of claim 9, wherein said predefined threshold is a smallest decision value of the number of decision values.

11. The computer readable storage medium of claim 9, wherein the first block and the second block each represent a same first squared area of 4×4 pixels in a moving picture.

12. The computer readable storage medium of claim 11, wherein said first squared area covers one sixteenth of a macro block representing a second squared area of 16×16 pixels in said moving picture.

13. The computer readable storage medium of claim 12, wherein the method further comprises:

determining a skip vector for said macro block based on existing motion vectors of spatially adjacent blocks in said moving picture; and executing said transforming the first block by a binary-transform function only if said skip vector is equal to zero.

14. The computer readable storage medium of claim 9, wherein said binary-transform function includes a Hadamard transform or a transform derived from said Hadamard transform.

15. The computer readable storage medium of claim 9, wherein the binary-transform coefficients include four binary-transform coefficients in an uppermost left corner of the partial third block.

16. The computer readable storage medium of claim 9, further comprising:

executing said transforming the first block by a binary-transform function prior to said transforming the first block by an integer-transform function; and skipping said transforming the first block by an integer-transform function if the second block includes only zeros.

17. An apparatus configured to transform a first block of residual pixel values of moving pictures, said apparatus comprising:

means for identifying the first block of residual pixel values of moving pictures;

means for transforming the residual pixel values of the first block by a binary-transform function and for generating a corresponding partial third block of binary-transform coefficients;

means for creating a second block of integer-transform coefficients based on the first block;

means for defining the second block to include only zeros when all of the binary-transform coefficients in the partial third block are less than a predefined threshold; and means for skipping the second block when coding video if including only zeros.

18. An apparatus configured to transform a first block of residual pixel values of moving pictures, said apparatus comprising:

a transformation unit configured to transform the residual pixel values of the first block by a binary-transform function and to generate a corresponding partial third block of binary-transform coefficients;

a block editing unit configured to create a second block of integer transform coefficients based on the first block;

a defining unit configured to define said second block to include only zeros when all of said binary-transform coefficients in the partial third block are less than a predefined threshold; and a coding unit configured to skip the second block when coding video if including only zeros.

19. The method of claim 1, wherein the partial third block of binary-transform coefficients in the third block include four coefficients that form an upper left corner of the third block.

20. A method of coding video, comprising:

identifying a first macro-block of video data;

dividing the macro-block into a plurality of smaller blocks; and processing each of the smaller blocks, wherein the processing includes, transforming residual pixel values of each of the smaller blocks by a binary-transform function and generating a plurality of corresponding binary-transform coefficient blocks, defining each of the smaller blocks to include only zeros when a subset of values included in the corresponding binary-transform coefficient blocks are less than a predefined threshold, creating a second macro-block that includes only zeros when all the smaller blocks of the macro-block are defined to include only zeros, and skipping the second macro-block when coding the video.

21. The method of claim 20, wherein the macro-block is a 16×16 pixel block and the dividing includes dividing the 16×16 pixel block into a plurality of 4×4 sub-blocks.

22. The method of claim 20, wherein the macro-block is a 16×16 pixel block and the dividing includes dividing the 16×16 pixel block into plurality of 8×8 blocks.

23. The method of claim 20, wherein the subset of values is four coefficients that form an upper left corner of each of the corresponding binary-transform coefficient blocks.

24. The method of claim 20, wherein the processing performed on each of the smaller blocks is performed in parallel.

* * * * *